Aug. 14, 1945.  W. L. TRAFTON  2,382,945
FASTENER DEVICE FOR ELECTRICAL CONDUCTORS
Filed Sept. 13, 1943  2 Sheets-Sheet 1
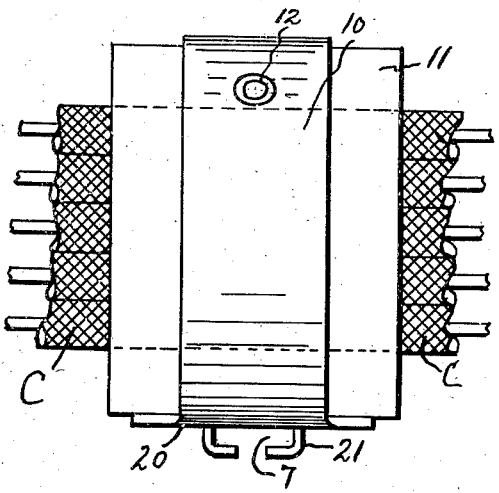
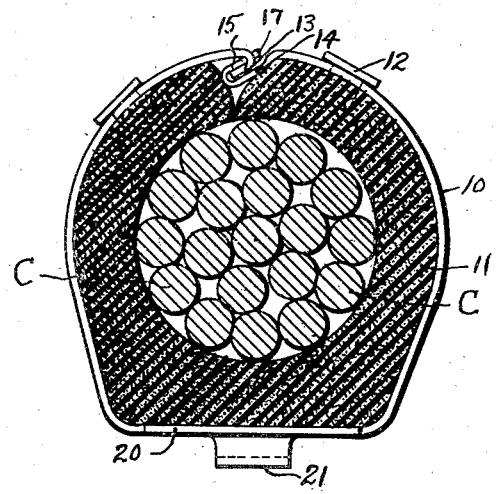
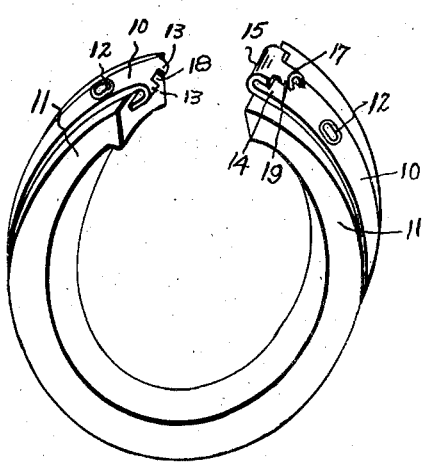
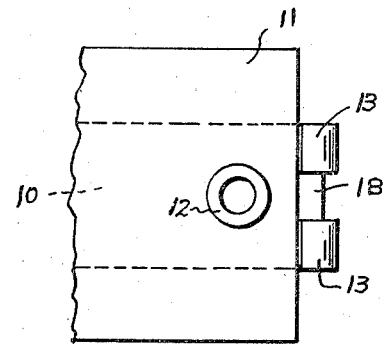
Inventor
Warren L. Trafton.
By Walter S. Jones
Attorney

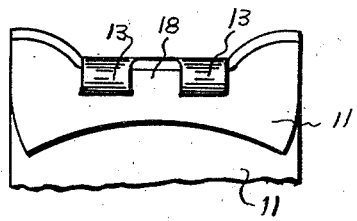
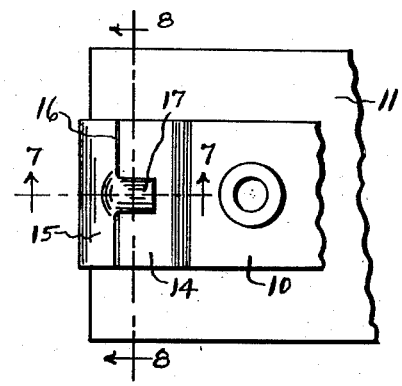
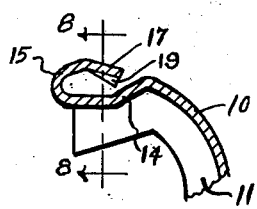
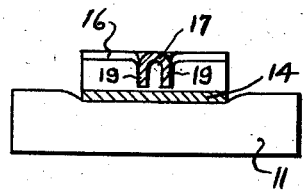
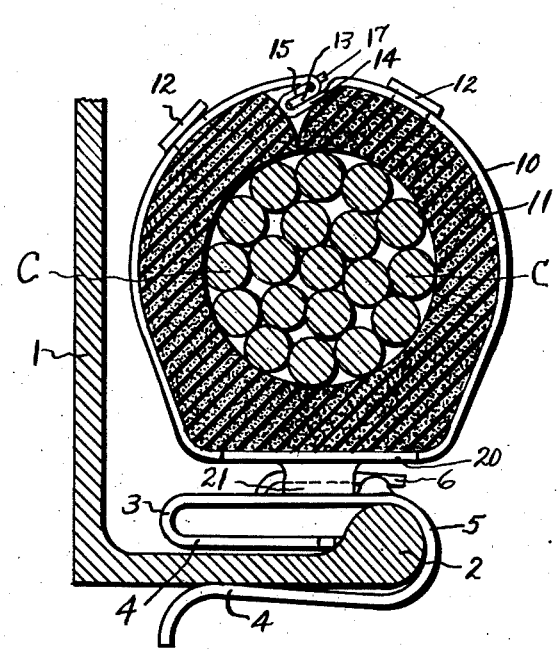

Patented Aug. 14, 1945

2,382,945

UNITED STATES PATENT OFFICE 2,382,945

FASTENER DEVICE FOR ELECTRICAL CONDUCTORS

Warren L. Trafton, Cambridge, Mass., assignor to United-Carr Fastener Corporation, Cambridge, Mass., a corporation of Massachusetts Application September 13, 1943, Serial No. 502,394

9 Claims. (Cl. 24—81)

The present invention relates to fastener clamps for clamping a plurality of strands, such as electrical conductors, in grouped relation and aims generally to improve existing fastener clamps of this type.

One of the primary aims and objects of the present invention is the provision of a fastener clamp, which may take the form of a band, provided at its terminal ends with improved interlocking means for connecting the ends of the band in loop form.

A further object of the invention is the provision of an improved clamp of the above described type provided with means to prevent the lateral shifting of adjoining interlocked ends.

Other objects and uses of the invention will be apparent from an inspection of the accompanying drawings and annexed specification illustrating and describing a preferred embodiment of the invention.

In the drawings:

Fig. 1 is a side elevation of my improved fastener clamp;

Fig. 2 is an end elevation thereof in closed or clamped position;

Fig. 3 is a perspective view thereof in open or unclamped position;

Fig. 4 is a fragmental bottom plan view of one end of the clamp band illustrating one of the interlocking ends;

Fig. 5 is an edge view thereof;

Fig. 6 is a fragmental top plan view of the opposite band and illustrating one of the interlocking ends;

Fig. 7 is an edge view thereof;

Fig. 8 is a transverse sectional view thereof as taken on the line 8—8 of Figs. 6 and 7; and Fig. 9 is an end elevation illustrating one manner of mounting my improved fastener clamp to a supporting part.

Referring to the drawings, a typical installation, illustrated in Fig. 9, comprises an attaching member and clamp particularly adaptable for securing a group of wires in grouped relation to a framework or other suitable supporting part of aircraft, motor vehicle, ship, building or other structure. The framework or supporting part may comprise a metal or other structural member 1, for example a channel-shaped girder or beam as is commonly used in aircraft or other installations, and these beams or channels frequently have beaded flange edges as designated at 2.

My improved fastener clamp is adapted to be detachably mounted on said support 1 and preferably housed between the opposed flanges of the members when a channel-shaped support is employed, and this may be readily accomplished by employing a resilient metal attaching member 3 of any suitable construction. One type of attaching member which has been found suitable for the purpose comprises a strip of metal bent to provide spaced resilient portions 4 resiliently engaging the opposite faces of one of the support flanges, said portions 4 being connected by a bight portion 5 overlying the edge of the support 1.

A tongue 6 may be struck from the upper portion 4 of the attaching member having an outwardly extending free end adapted to be inserted in a recess 7 in the fastener clamp and by this means the clamp may be quickly and readily attached to and removed from the support. The particular attaching means illustrated forms no part of the present invention and it will be understood that other forms may be used.

My improved fastener clamp comprises a band-like member 10, the ends of which may be readily connected together to form a closed loop to receive and hold a plurality of wires or conductors C in grouped relation and which may be readily and quickly attached to and detached from the attaching member 3 connected to the supporting part 1. Preferably, the end connecting means of the band is in the form of interlocking complementary hooked ends 13, 15 so constructed that when interlocked together they will not be accidentally disconnected by lateral movement of the ends in a direction parallel to the central axis of the loop.

In the illustrated embodiment shown in the drawings the clamp comprises a band 10 of resilient material, for example metal, adapted to be bent into a looped or substantially circular form. The band is preferably formed of such resilient material that it is under tension when closed, and assumes an open expanded form when the ends are disengaged (as shown in Fig. 3) to permit the ready insertion or replacement of wires to the interior of the loop. The band 10 may have an inner lining 11 of highly flexible insulating material, for example a strip of sponge rubber, which may be connected to the band adjacent the ends thereof by suitable means, for example rivets 12 or the like. The strip 11 of insulating material is preferably of slightly less length than the band so as to provide end portions 13, 15 of the band 10 extending slightly beyond the strip, which ends may be constructed for interlocking engagement without interference from the strip, yet which will provide a substantially continuous annular insulating member when the band is closed to looped form, as shown in Fig. 2.

The opposed free ends of the band 10 are preferably constructed to form opposed complementary interlocking ends and conveniently one of the ends may have an inwardly hooked portion 13 and the other end an inwardly offset portion 14 formed with an outwardly hooked terminal end 15, the latter being adapted to be hooked in the inwardly hooked portion 13 with the inwardly hooked portion overlying the outwardly hooked portion 15, as shown in Fig. 2.

The complementary hooked portions are provided with inter-engaging means adapted to be interlocked together as a result of the inter-engagement of the complementary hooked portions to prevent relative sidewise movement of the inter-engaged hooked ends such as might accidentally disengage them.

One convenient construction for accomplishing the above stated result is the provision of an extension or bead 17 on the band 10 extending circumferentially beyond the terminal edges 16 of the outwardly hooked portion and the formation of a slot or recess 18 in the inwardly hooked end 13, said recess 18 dividing the hooked end 13 into two spaced hooked portions adapted to straddle the extension or bead 17 as the hooked ends are brought into interlocking engagement. Conveniently the bead or extension 17 may be formed by merely bending the sides 19 of the extension 17 downwardly to provide a crowned bead or extension adapted to smoothly enter the recess 18. As will be apparent from Fig. 6, the upwardly hooked end 15 is thus substantially T-shaped while the downwardly hooked end may be said to be substantially U-shaped, as shown in Figs. 4 and 5.

The band is preferably formed with a base portion 20 having a bridge portion 21 spaced therefrom providing an intervening recess 7 for the reception of a part of the attaching member, for example the tongue 6, to readily effect mounting of the clamp on the supporting part 1.

As a result of my invention a plurality of wires or conductors C may be grouped within the loop of the open band, as shown in Fig. 3, and the ends of the band closed to interlocking position. The clamp with the grouped wires therein may be then readily mounted on the supporting part by merely slipping the bridge 21 under the tongue 6 of the attaching member 3.

Thus it will be seen that the device is extremely simple in construction and permits of a speedy installation and a considerable saving of assembly labor, which is highly desirable in the mass production of aircraft and other carriers. The improved interlocking connection between the ends of the band 10 avoids accidental release thereof due to vibration or other causes thus materially increasing the factor of safety of the installation.

Although I have illustrated and described a preferred form of my invention, I do not wish to be limited thereby, because of the scope of my invention is best defined by the following claims.

I claim:

1. A fastener device comprising a band bendable into the form of a closed loop and adapted to receive and hold an article such as wire, the opposite terminal ends of said band being formed with cooperating interlocking hooked portions to resist separation of the ends in an expandible direction outwardly from the center of the loop, and means on the interlocking hooked portions for preventing lateral shifting of the interlocked ends laterally in the plane of the interlocked ends.

2. A fastener device comprising a resilient member bendable into the form of a closed loop and adapted to receive and hold an article such as wire, the opposite terminal ends of said member being formed with reversely hooked portions adapted to be interlocked together to resist separation of the ends in an expandible direction outwardly from the center of the loop and means in said hooked portions for preventing lateral shifting of the interlocked ends laterally in a plane of the interlocked ends.

3. A fastener device comprising a band bendable into the form of a closed loop and adapted to receive and hold an article such as wire, the opposite terminal ends of said band being formed with cooperating interlocking hooked portions to resist separation of the ends in an expandible direction outwardly from the center of the loop, one of said hooked portions being formed with a tongue and the other of said hooked portions being formed with a recess to receive said tongue for locking said ends together against relative shifting movement laterally.

4. A fastener device comprising a resilient band adapted to be connected at its opposite ends to form a loop to receive and hold a plurality of conductors, one of said band ends being formed with an inwardly hooked terminal portion and the other band end formed with an outwardly hooked terminal portion, said hooked terminal portions being formed with interlocking tongue and slot means preventing shifting of said ends laterally when in interlocked engagement.

5. A fastener device comprising a resilient band adapted to be connected at its opposite ends to form a loop to receive and hold a plurality of conductors, one of said band ends being formed with an inwardly hooked terminal portion and the other band end formed with an outwardly hooked terminal portion, said hooked terminal portions being formed with interlocking means preventing shifting of said ends laterally when in interlocked engagement and a strip of soft elastic material positioned along the inner face of said band and means for securing said elastic material to said bands adjacent the ends and inwardly of the hooked ends thereof.

6. A fastener device comprising a band bendable into the form of a closed loop and adapted to receive and hold an article such as wire, the opposite terminal ends of said band being formed with interlocking hooked ends, said complementary hooked ends provided with inter-engaging means operative as a result of the interlocking of said hooked ends for preventing relative sidewise movement of the interlocked hooked ends.

7. A fastener device comprising a resilient band adapted to be connected at its opposite ends to form a loop to receive and hold a plurality of conductors, one of said band ends being formed with an inwardly hooked centrally slotted terminal portion and the other band end formed with an outwardly directed hooked end and an angularly disposed bead adapted to be positioned in the slot of the inwardly hooked end when the hooked ends are interlocked.

8. A fastener device comprising a resilient band adapted to be connected at its opposite ends to form a loop to receive and hold a plurality of conductors, one of said band ends being formed with an inwardly hooked centrally slotted terminal portion and the other band end formed with an outwardly directed hooked T-shaped end, the stem of the T being adapted to be positioned within the slot of the inwardly hooked end when the hooked ends are interlocked.

9. A fastener device comprising a resilient band adapted to be connected at its opposite ends to form a loop to receive and hold a plurality of conductors, one of said band ends being formed with an inwardly hooked laterally spaced terminal portion and the other band end being formed with an outwardly hooked end and an angularly disposed bead adapted to be positioned between said spaced hooked terminal portions when the ends of said band are interlocked together.

WARREN L. TRAFTON.